Patented Aug. 18, 1942

2,293,253

UNITED STATES PATENT OFFICE 2,293,253

HANDLING OF ACID SLUDGES

Harold F. Galindo, Concord, and Benjamin G. Jones, Associated, Calif., assignors to Tide Water Associated Oil Company, San Francisco, Calif., a corporation of Delaware No Drawing. Application January 8, 1940, Serial No. 312,918

8 Claims. (Cl. 196—148)

This invention relates to acid sludges derived from the treatment of hydrocarbon oils with sulphuric acid, and more particularly to acid sludges derived from the treatment of lubricating stocks. Acid sludges from lubricating oil treatment are usually difficult to dispose of due to their consistency and to their acid content. In certain cases they are as hard as coke at atmospheric temperature and require heating to about 200° F. to be made pumpable.

It is an object of this invention to render these sludges sufficiently fluid that they may be pumped at ordinary temperatures.

It is another object of this invention to substantially remove the acid content of the sludges.

Another object is to render such sludges suitable for burning in conventional fuel oil burners.

Heretofore various methods have been tried to convert lubricating oil acid sludges into more fluid material to be used as boiler fuel. Included among such methods is treatment with caustic soda and steaming in the presence of water. Such methods have been only partially successful and in some cases it has not been possible, so far, to change the nature of the hard acid sludges. Certain sludges have required removal by pick and shovel and subsequent transportation to an open field to be burned.

According to the present invention acid sludge after removal from the treated oil is thoroughly mixed with spent caustic alkali solution obtained from the neutralization of acid treated cracked distillates with caustic alkali. After settling, the mixture separates into two layers, an upper layer consisting chiefly of oily material which is of suitable viscosity to be readily handled, and a lower aqueous layer consisting chiefly of free and combined sulphuric acid, alkali salts and water. To more readily carry out the mixing of the sludge and spent alkali heat may be employed to advantage and a temperature of 150° F. to 200° F. has been found to be beneficial. The addition of water, preferably hot, to the mixture has been found to assist in the separation of the layers. In most cases, the amount of water present (including that in the spent caustic used) may be about 30% to 70% of the volume of the sludge, but the amount may be more or less than this depending on the particular stocks treated or on the strength and quantity of sulphuric acid used. Also, separation of the layers is facilitated by adding from 10% to 50% of hydrocarbon oil to the mixture, and for this purpose almost any available "slop" oil may be used, as, for example, extract from the well known Edeleanu process, cracked distillate rerun bottoms, oil recovered from settling ponds, or various residua from distillation operations.

The spent alkali used to effect the decomposition of the sludge is obtained by neutralizing cracked distillates that have been treated with sulphuric acid for the removal of sulphur, color-forming, and/or gum-forming constituents, as in the manufacture of cracked gasolines. Customarily, cracked distillates after treatment with sulphuric acid are neutralized by washing with a caustic soda solution, or other alkali. The alkali solution is used repeatedly until the caustic content is reduced to a low figure after which it is replaced with fresh alkali solution. It is this spent alkali which has been found to have the property of decomposing sludges according to the invention. Spent alkali from the neutralization of acid treated straight run distillates is not effective in breaking the more refractory sludges, nor has fresh alkali solution been found suitable.

The amount of spent alkali to be added to the sludge for effective decomposition thereof may vary somewhat depending on the characteristics of the sludge. Ordinarily approximately equal quantities of sludge and spent alkali solution are effective, though the ratio may vary between about 4:1 and 1:4. In any event by simple laboratory tests, the operator may easily determine the most suitable proportions for any given case.

At times instead of, or in addition to, neutralizing acid treated cracked distillates by washing with an alkaline solution, neutralization is effected by distillation of the cracked distillate in the presence of caustic soda, or other alkali. It has been found that the bottoms from this distillation contains constituents similar to the spent caustic solution described above and which are suitable for carrying out the invention. For this purpose, the bottoms from the caustic distillation are extracted with water using, for example, about 1 part water to about 7 parts of the bottoms. Other proportions may be used and the proper choice of proportions is within the skill of an experienced worker. The main point is to obtain an aqueous solution of the water soluble constituents of the bottoms. This aqueous extract may be substituted for the spent caustic solution in the treatment of the sludges as described above.

Though the invention is of prime importance in the treatment of sludges of an extremely viscous or solid nature, such as is obtained by the action of 93% to 100% sulphuric acid on lubricating stocks, more fluid sludges, such as are obtained from the use of fuming sulphuric acid, are advantageously decomposed by the process described and thereby easily rendered suitable for use as fuel. There appear to be constituents present in the spent alkali from cracked distillates, which are particularly adapted for decomposing sludges and which are not present (at least in sufficient quantities) in other refinery waste alkali.

The following is an example of the treatment of acid sludges derived from the acid treatment of a lubricating stock:

1400 barrels of a lubricating distillate derived from Coalinga crude oil and having a viscosity of 60 seconds Saybolt Universal at 210° F. was treated with 98% sulphuric acid in three "dumps," or increments, of 20 pounds of acid per barrel of oil in each increment. The temperature of treatment was from 80° F. to 115° F. After the addition of each increment of acid the mixture was thoroughly agitated for from 1 to 2 hours and the resulting sludge allowed to settle and be removed. The sludge obtained from the first increment amounted to about 150 barrels, was fluid at 150° F., and presented little difficulty in disposal. However, the sludges from the second and third increments had a melting point of 210° F. and were, consequently, very difficult to handle by ordinary methods.

50 to 100 barrels of spent alkali from pressure distillate neutralization was heated to 175° F. To this was added, with constant agitation, the sludges obtained from the second and third increments (amounting to 90 barrels and 60 barrels respectively). Agitation was provided with pierced lead steam coils. After the mixture became homogeneous, 20% of water and 20% of slop oil were added. The whole was then mixed with steam agitation and allowed to settle overnight, during which time the mixture separated into two layers. The lower, aqueous, layer was withdrawn leaving a sludge oil having a viscosity of 209 seconds Saybolt Furol at 122° F. and a water and sediment content of 1.0% by A. S. T. M. method D-96-35. This sludge oil was, therefore, suitable for use as fuel.

We claim as our invention.

1. The process of decomposing acid sludges to recover therefrom organic constituents capable of use as liquid fuel which comprises: mixing an acid sludge derived from the action of sulphuric acid on a viscous hydrocarbon oil with aqueous spent alkali derived from the neutralization of a sulphuric acid treated cracked distillate, and separating the resulting aqueous layer from the resulting oil layer containing said constituents.

2. The process according to claim 1 in which the acid sludge is derived from treatment of a lubricating oil and the spent alkali is derived from treatment of a lower boiling cracked distillate.

3. The process of decomposing acid sludges to recover therefrom organic constituents capable of use as liquid fuel which comprises: mixing an acid sludge derived from the action of sulphuric acid on a viscous hydrocarbon oil with aqueous spent alkali derived from washing a sulphuric acid treated cracked distillate with an aqueous alkali solution, and separating the resulting aqueous layer from the resulting oil layer containing said constituents.

4. The process of decomposing acid sludges to recover therefrom organic constituents capable of use as liquid fuel which comprises: mixing an acid sludge derived from the action of sulphuric acid on a viscous hydrocarbon oil with aqueous spent alkali derived from washing a sulphuric acid treated cracked distillate with a caustic soda solution, and separating the resulting aqueous layer from the resulting oil layer containing said constituents.

5. The process of decomposing acid sludges to recover therefrom organic constituents capable of use as liquid fuel which comprises: mixing an acid sludge derived from the action of sulphuric acid on a viscous hydrocarbon oil with aqueous spent alkali derived from the distillation of a sulphuric acid treated cracked distillate in the presence of an alkali, and separating the resulting aqueous layer from the resulting oil layer containing said constituents.

6. The process of decomposing acid sludges to recover therefrom organic constituents capable of use as liquid fuel which comprises: mixing at a temperature between about 150° F. to 200° F. an acid sludge derived from the action of sulphuric acid on a viscous hydrocarbon oil with aqueous spent alkali derived from the neutralization of a sulphuric acid treated cracked distillate, and separating the resulting aqueous layer from the resulting oil layer containing said constituents.

7. In a process wherein an acid sludge derived from the action of sulphuric acid on a viscous hydrocarbon oil is separated into an oily portion and an aqueous portion, the step which comprises: mixing with such an acid sludge, prior to such separation, aqueous spent alkali derived from the neutralization of a sulphuric acid treated cracked distillate, whereby the separation is more readily effected.

8. In a process wherein a sulphuric acid-oil sludge of highly viscous nature is treated to render the same readily amenable to pumping, the step which comprises: mixing an acid sludge derived from the action of concentrated sulphuric acid on a petroleum lubricating oil stock with spent alkali derived from the neutralization of a sulphuric acid treated lower boiling cracked distillate.

HAROLD F. GALINDO.
BENJAMIN G. JONES.